United States Patent Office 2,794,027
Patented May 28, 1957

2,794,027

PREPARATION OF BIS(CHLOROMETHYL)-OXETANE

William M. Schilling, New Castle County, Del., assignor to Hercules Powder Company, Wilmington, Del., a corporation of Delaware No Drawing. Application June 1, 1954,
Serial No. 433,830

16 Claims. (Cl. 260—333)

This invention relates to an improved process of preparing 3,3-bis(chloromethyl)oxetane by reacting pentaerythritol trichlorohydrin or an ester thereof with an aqueous solution of an inorganic base.

The 3,3-bis(halomethyl)oxetanes, and particularly 3,3-bis(chloromethyl)oxetane, may be polymerized to produce valuable polymeric materials useful in the manufacture of film, plastics, etc. The only known method of preparing 3,3-bis(halomethyl)oxetanes has been by the ring closure of pentaerythritol trihalohydrins with an ethanolic solution of potassium hydroxide. However, the yield is only mediocre, and the product is contaminated with alkoxymethyloxetanes such as 3-ethoxymethyl-3-halomethyloxetane, and 3,3-bis(ethoxymethyl)oxetane, which are produced as by-products.

Now, in accordance with this invention, it has been found that 3,3-bis(chloromethyl)oxetane may be prepared in excellent yields from pentaerythritol trichlorohydrin or esters thereof by contacting a dispersion of the pentaerythritol trichlorohydrin or ester thereof in an aqueous medium with an alkali metal hydroxide or alkaline earth metal hydroxide provided that the concentration of hydroxide dissolved in the aqueous phase is no greater than about 70%, the reaction being carried out at a temperature within the range of from about 90° C. to about 170° C. It was most surprising to discover that this ring closure reaction could be carried out in an aqueous reaction medium, the presence of water in such a process normally functioning to open the ring rather than to aid in closing the ring. The ring closure as carried out by this process not only takes place but results in high yields of the desired product with very little by-product formation. It is advantageous over the use of ethanol as the reaction medium in that the product contains none of the alkoxymethyloxetane produced as by-products when ethanol is used as the reaction medium, and furthermore avoids the necessity of alcohol recovery when it is operated on a commercial scale. In addition, the product is readily separated from the reaction mixture by steam distillation.

The following examples will illustrate the process of preparing 3,3-bis(chloromethyl)oxetane in accordance with this invention. All parts and percentages are by weight unless otherwise indicated.

*Example 1*

A reaction vessel equipped with an agitator, rectification column, and condenser for steam distillation and provision for return of the water distillate was charged with 59.2 parts of a freshly distilled pentaerythritol trichloromonoacetate and 46.3 parts of a 49% aqueous sodium hydroxide solution. Water, 73.8 parts, was then added, making the concentration of the aqueous sodium hydroxide solution 19%, the amount of hydroxide being used equal to a 12% excess over that theoretically required. Agitation was started and the reaction mixture was rapidly heated to the boiling point and held at a temperature of 107-108° C. After ½ hour 10.5 parts of organic distillate had been collected. Infrared analysis indicated that it contained 76% 3,3-bis(chloromethyl)-oxetane and 7.6% of pentaerythritol trichloroacetate. After a second ½-hour period 19.5 parts of additional organic distillate was collected which on analysis was shown to contain 93% 3,3-bis(chloromethyl)oxetane and 0.8% pentaerythritol trichloroacetate. After a third ½-hour period organic material had stopped coming over with the steam distillate. The third cut amounted to 9.5 parts and contained 96% 3,3-bis(chloromethyl)oxetane with no pentaerythritol trichloroacetate or pentaerythritol trichlorohydrin detected. The yield of 3,3-bis(chloromethyl)oxetane so obtained amounted to a total of 91% and the percent of pentaerythritol trichloroacetate reacted was 98%.

*Example 2*

Example 1 was repeated except that the solution of sodium hydroxide used had a concentration of 29% and a 6% excess of it was used. The reaction was carried out at 110–114° C. for a total of 2½ hours. An 88% yield of 3,3-bis(chloromethyl)oxetane was obtained with 99% of the pentaerythritol trichloroacetate having reacted.

*Example 3*

Example 1 was repeated using a 40% solution of sodium hydroxide, in 6% excess, and the reaction was carried out at 113–120° C. for 2½ hours. The yield of 3,3-bis(chloromethyl)oxetane amounted to 81%, 100% of the pentaerythritol trichloroacetate having reacted.

*Example 4*

In this case Example 1 was repeated using an 18% aqueous sodium hydroxide solution, in 50% excess. The reaction was carried out at 106–107° C. for 2 hours. An 84% yield of 3,3-bis(chloromethyl)oxetane was obtained with 100% of the pentaerythritol trichloroacetate having reacted.

*Example 5*

The process of Example 1 was repeated except that the reaction mixture was refluxed for 3 hours (105–107° C.) instead of steam-distilling during the reaction. At the end of 3 hours the 3,3-bis(chloromethyl)oxetane was removed by steam distillation. An 81% yield of 3,3-bis(chloromethyl)oxetane was obtained with 100% of the pentaerythritol trichloroacetate having reacted.

*Example 6*

Into a rocking autoclave was charged 38.4 parts of a 17% aqueous sodium hydroxide solution (2% excess). A stainless steel tube charged with 19.1 parts of a freshly distilled pentaerythritol trichloroacetate was carefully lowered into the autoclave so as not to mix the two liquids. The autoclave was heated to 170° C. until the contents had reached thermal equilibrium, after which agitation was started and the pentaerythritol trichloroacetate mixed with the aqueous sodium hydroxide. There was no noticeable exothermic reaction, the pressure inside the autoclave rising to 19 p. s. i. g. After the reaction had continued at 170° C. for 30 minutes, the autoclave was removed from the heating jacket and quenched in ice water. When the temperature had dropped to 30° C., the autoclave was opened and the contents, made up of two liquid phases and containing no solid salts, were removed. The autoclave was washed with water and the washings were combined with the reaction product. The organic layer was separated and amounted to 15.7 parts. Infrared analysis showed it to contain 61% 3,3-bis(chloromethyl)oxetane, 21% pentaerythritol trichlorohydrin, and 6.4% pentaerythritol trichloroacetate. The yield of 3,3-bis(chloromethyl)oxetane was 79%. The percent of pentaerythritol trichloroacetate reacted was 95%.

Example 7

Following the procedure described in Example 6, 19.9 parts of pentaerythritol thrichlorohydrin was reacted with a 13% aqueous sodium hydroxide solution, used in 24% excess. The reaction was carried out at 130° C. for ½ hour. The yield of 3,3-bis(chloromethyl)oxetane so obtained was 70%, 88% of the pentaerythritol trichlorohydrin having reacted.

Example 8

A reaction vessel fitted with an agitator, condenser, and thermometer was charged with 50 parts of pentaerythritol trichloroacetate and 36 parts of 85% potassium hydroxide. To this was then added 36 parts of water to make a 50% solution of potassium hydroxide, in 30% excess. The temperature rose rapidly to 80° C. due to the exothermic reaction which took place. The reaction mixture was then refluxed at 112° C. for 0.4 hour. To the reaction mixture was then added 150 parts of water and the product was extracted with three 100-part portions of methylene chloride. The methylene chloride extracts were combined and dried over calcium sulfate. The calcium sulfate was removed by filtration and the methylene chloride was removed by distillation, the final stage being carried out under reduced pressure so as to remove the last traces of the solvent. The residue amounted to 30.3 parts and had a refractive index at 20° of 1.4852. An infrared analysis of the product showed that it contained 75% of 3,3-bis(chloromethyl)oxetane and 14% of pentaerythritol trichlorohydrin. Thus the yield of 3,3-bis(chloromethyl)oxetane was 68% and since no pentaerythritol trichloroacetate was recovered in the product, the percent of it that reacted was 100%.

Example 9

The process described in Example 8 was repeated except that a 50% solution of sodium hydroxide, in 16% excess, was used. The reaction was carried out at a temperature up to 145° C., the total reaction period being 1.5 hours. The yield of 3,3-bis(chloromethyl)-oxetane obtained was 72% with no pentaerythritol trichlorohydrin. The amount of pentaerythritol trichloroacetate reacted was 100%.

Example 10

The process described in Example 8 was repeated except that a 19% solution of sodium hydroxide was used, in 7% excess, and the reaction was carried out at 90° C. for 2 hours. There was obtained by this means a yield of 76% of 3,3-bis(chloromethyl)-oxetane and 25% of pentaerythritol trichlorohydrin, 100% of the pentaerythritol trichloroacetate having reacted.

Example 11

Into a reaction vessel equipped with an agitator and condenser was charged 50 parts of pentaerythritol trichloromonoacetate and 29 parts of 86% potassium hydroxide. To this mixture was added 12.5 parts of water, making a 60% aqueous potassium hydroxide solution. The temperature of the reaction mixture rose to 130° C. due to the exothermic reaction that took place. When the reaction was completed as seen by a drop in the temperature, water was added and the product was extracted with methylene chloride. The yields of 3,3-bis-(chloromethyl)oxetane and pentaerythritol trichlorohydrin were 59% and 17%, respectively, 100% of the pentaerythritol trichloromonoacetate having reacted.

Example 12

To a boiling mixture of 57.3 parts of pentaerythritol trichlorohydrin and 6.8 parts of water was added 13.6 parts of 97% sodium hydroxide, making a 65% aqueous solution of sodium hydroxide. The temperature of the reaction mixture rose to 142° C. and then slowly fell to 114° C., after which the reaction mixture was boiled for 40 minutes. Water was then added and the product was extracted with methylene chloride. The 3,3-bis-(chloromethyl)oxetane was obtained in 65% conversion and 71% yield.

Example 13

Into a reaction vessel equipped with an agitator, packed column, condenser, and decanter to permit steam distillation of the reaction mixture with continuous return of the stream distilled, was charged 59 parts of pentaerythritol trichloromonoacetate, 16.8 parts of calcium oxide, and 94.3 parts of water. Agitation was started and the reaction mixture was rapidly heated to the boiling point (100–102° C.) where it was held for 10 hours with continuous steam distillation of the reaction mixture. A total of 36.1 parts of organic distillate was obtained. The yields of 3,3-bis(chloromethyl)oxetane and pentaerythritol trichlorohydrin as determined by infrared analysis of the organic distillate were 24% and 45%, respectively. The pentaerythritol trichloromonoacetate was 98% reacted.

As may be seen from the foregoing examples, the process of this invention makes it possible to carry out the ring closure of either pentaerythritol trichlorohydrin or an ester thereof. The latter is particularly important since pentaerythritol trichlorohydrin is usually prepared by first preparing pentaerythritol trichlorohydrin acetate or other ester thereof and then hydrolyzing the ester. Thus this process makes it possible to omit one step in the overall process of preparing 3,3-bis(chloromethyl)-oxetane from pentaerythritol. Any ester of pentaerythritol trichlorohydrin may be used, as, for example, carboxylic acid esters such as pentaerythritol trichlorohydrin acetate, pentaerythritol trichloropropionate, etc., or inorganic esters such as pentaerythritol trichlorohydrin hydrogen sulfate, etc.

In accordance with this invention, it has been found that the reaction between the pentaerythritol trichlorohydrin or ester thereof and inorganic base may be carried out by reacting an aqueous dispersion of the pentaerythritol trichlorohydrin compound with an alkali metal hydroxide or alkaline earth metal hydroxide. Any alkali metal or alkaline earth metal hydroxide may be used, as, for example, sodium hydroxide, potassium hydroxide, calcium hydroxide, barium hydroxide, etc. The amount of inorganic base that is used is, of course, arbitrary, but for high yields at least the theoretical amount should be used. Thus for the ring closure of one mole of pentaerythritol trichlorohydrin, one mole of alkali metal hydroxide or one-half mole of alkaline earth metal hydroxide would be required and twice these amounts of base would be required for a pentaerythritol trichlorohydrin ester. Usually an excess of the inorganic base is used. For example, the foregoing examples have shown the use of from 2 to 50% excess of the base. However, the concentration of the aqueous solution of inorganic base is an important factor and should be less than about 70%. While the reaction will take place with solutions of higher concentrations, the yield of the desired product is greatly reduced and large quantities of undesirable by-products are produced. Preferably, the concentration of the hydroxide dissolved in the aqueous phase will be less than about 50%. When an alkali metal hydroxide is used for the ring closure reaction, the pentaerythritol trichlorohydrin compound may be simply dispersed in an aqueous solution of the base and heated, the concentration of the hydroxide in the aqueous phase being less than about 70%, preferably from about 10% to about 70% and more preferably from about 10% to about 50%, a sufficient amount of said aqueous solution being used to furnish the desired ratio of alkali to pentaerythritol trichlorohydrin. In the case of the less soluble alkaline earth hydroxides, or their oxides, only part of the hydroxide need be dissolved. For example, a slurry of calcium hydroxide, or calcium oxide, may be used and the pentaerythritol trichlorohydrin compound dispersed therein since the concentration of dissolved calcium hydroxide can obviously not exceed the limits set forth above.

The temperature at which the reaction between the pentaerythritol trichlorohydrin or ester thereof and the inorganic base is carried out may be varied over a wide range, but more simply is carried out at the boiling temperature of the reaction mixture. In general, a temperature within the range of from about 90° C. to about 170° C. is used, and more preferably a temperature within the range of from about 100° C. to about 130° C. is used. Temperatures above 170° C. may be used, but again may result in lower yields of the desired product. As illustrated by the foregoing examples, the process may be carried out at any pressure, but the use of either subatmospheric or superatmospheric pressure is not generally required.

In carrying out the process in accordance with this invention, any means may be employed for maintaining intimate contact between the pentaerythritol trichlorohydrin compound and the aqueous solution of base. Usually the dispersion of the organic phase in the aqueous phase may be maintained by thorough agitation of the reaction mixture. However, wetting or dispersing agents may also be used, as, for example, soaps such as sodium stearate, etc., alkylarylsulfonates, and preferably nonionic wetting agents such as the nonylphenol ethylene oxide adduct, etc.

The 3,3-bis(chloromethyl)oxetane may be separated by any desired fashion. Since it is present in the organic phase, the organic phase may be removed and the 3,3-bis-(chloromethyl)oxetane distilled therefrom or it may be extracted from the reaction mixture by means of a suitable organic solvent such as methylene chloride, etc. However, higher yields are obtained if the 3,3-bis(chloromethyl)oxetane is removed as it is formed by allowing it to steam-distill out of the reaction vessel. It can then be separated from the steam distillate and purified by distillation or other means. The steam distillation method of removing the product is particularly advantageous when the process is carried out as a continuous operation. In the latter case part of the water phase of the distillate may be used for making up the aqueous alkali solution that is continuously fed along with the pentaerythritol trichlorohydrin or ester thereof to the well-agitated reaction mixture in the reaction vessel.

By carrying out the process in accordance with this invention, it is possible to obtain 3,3-bis(chloromethyl)oxetane in high yields and conversions. The reaction is one which takes place rapidly but is also one which is easily controlled. Of particular advantage is the fact that it avoids the necessity of recovering a solvent, as is necessary when ethanol is used as the reaction medium for the process. The crude 3,3-bis(chloromethyl)oxetane is very easily recovered from this aqueous process and, not containing any desirable by-products, is more easily purified.

What I claim and desire to protect by Letters Patent is:

1. The process of preparing 3,3-bis(chloromethyl)-oxetane which comprises contacting a dispersion of one of the group consisting of pentaerythritol trichlorohydrin and esters thereof in aqueous medium with an inorganic base selected from the group consisting of alkali metal hydroxides and alkaline earth metal hydroxides at a temperature of from about 90° C. to about 170° C., the concentration of dissolved hydroxide in the aqueous phase being no greater than about 70%.

2. The process of preparing 3,3-bis(chloromethyl)-oxetane which comprises contacting a dispersion of one of the group consisting of pentaerythritol trichlorohydrin and esters thereof in aqueous medium with an inorganic base selected from the group consisting of alkali metal hydroxides and alkaline earth metal hydroxides at a temperature of from about 100° C. to about 130° C., the concentration of dissolved hydroxide in the aqueous phase being no greater than about 50%.

3. The process of preparing 3,3-bis(chloromethyl)-oxetane which comprises heating a dispersion of an ester of pentaerythritol trichlorohydrin in an aqueous solution containing from about 10% to about 70% of an alkali metal hydroxide to a temperature of from about 90° C. to about 170° C.

4. The process of preparing 3,3-bis(chloromethyl)-oxetane which comprises contacting a dispersion of an ester of pentaerythritol trichlorohydrin in aqueous medium with an alkaline earth metal hydroxide at a temperature of from about 90° C. to about 170° C., the concentration of dissolved hydroxide in the aqueous phase being no greater than about 70%.

5. The process of preparing 3,3-bis(chloromethyl)-oxetane which comprises heating a dispersion of an ester of pentaerythritol trichlorohydrin in an aqueous solution containing from about 10% to about 50% of an alkali metal hydroxide to a temperature of from about 100° C. to about 130° C.

6. The process of preparing 3,3-bis(chloromethyl)-oxetane which comprises heating a dispersion of an ester of pentaerythritol trichlorohydrin in an aqueous slurry of calcium hydroxide to a temperature of from about 90° C. to about 170° C.

7. The process of preparing 3,3-bis(chloromethyl)-oxetane which comprises heating a dispersion of pentaerythritol trichlorohydrin acetate in an aqueous solution containing from about 10% to about 70% of sodium hydroxide to a temperature of from about 90° C. to about 170° C.

8. The process of preparing 3,3-bis(chloromethyl)-oxetane which comprises heating a dispersion of pentaerythritol trichlorohydrin acetate in an aqueous solution containing from about 10% to about 50% of sodium hydroxide to a temperature of from about 100° C. to about 130° C.

9. The process of preparing 3,3-bis(chloromethyl)-oxetane which comprises heating a dispersion of pentaerythritol trichlorohydrin acetate in an aqueous solution containing from about 10% to about 50% of potassium hydroxide to a temperature of from about 100° C. to about 130° C.

10. The process of preparing 3,3-bis(chloromethyl)-oxetane which comprises heating a dispersion of pentaerythritol trichlorohydrin acetate in an aqueous solution containing from about 10% to about 70% of an alkali metal hydroxide to a temperature of from about 90° C. to about 170° C. and removing the 3,3-bis(chloromethyl)-oxetane from the reaction mixture as it is formed.

11. The process of preparing 3,3-bis(chloromethyl)-oxetane which comprises heating a dispersion of pentaerythritol trichlorohydrin acetate in an aqueous solution containing from about 10% to about 70% of an alkali metal hydroxide to a temperature of from about 90° C. to about 170° C. and steam-distilling the 3,3-bis(chloromethyl)oxetane from the reaction mixture as it is formed.

12. The process of preparing 3,3-bis(chloromethyl)-oxetane which comprises heating a dispersion of pentaerythritol trichlorohydrin acetate in an aqueous solution containing from about 10% to about 50% of an alkali metal hydroxide to a temperature of from about 100° C. to about 130° C. and steam-distilling the 3,3-bis(chloromethyl)oxetane from the reaction mixture as it is formed.

13. Process for preparing 3,3-bis(chloromethyl)oxetane from a material of the group consisting of pentaerythritol trichlorohydrin and esters thereof characterized in that ring closure of said material is carried out in aqueous medium with an inorganic base selected from the group consisting of alkali metal hydroxides and alkaline earth metal hydroxides at a temperature of from about 90° C. to about 170° C. with concentration of said inorganic base in the aqueous phase being no greater than about 70%.

14. Process for preparing 3,3-bis(chloromethyl)oxetane from a material of the group consisting of pentaerythritol trichlorohydrin and esters thereof characterized in that ring closure of said material is carried out in aqueous medium with an inorganic base selected from the group consisting of alkali metal hydroxides and alkaline earth metal hydroxides at a temperature of from about 90° C. to about 170° C. with concentration of said inorganic base in the aqueous phase being no greater than about 70% and with separation of said oxetane being by steam distillation.

15. Process for preparing 3,3-bis(chloromethyl)oxetane from a material of the group consisting of pentaerythritol trichlorohydrin and esters thereof characterized in that ring closure of said material is carried out in aqueous medium with an inorganic base selected from the group consisting of alkali metal hydroxides and alkaline earth metal hydroxides at the boiling temperature of the reaction mixture with concentration of said inorganic base in the aqueous phase being no greater than about 70%.

16. Process for preparing 3,3-bis(chloromethyl)oxetane from a material of the group consisting of pentaerythritol trichlorohydrin and esters thereof characterized in that ring closure of said material is carried out in aqueous medium with an inorganic base selected from the group consisting of alkali metal hydroxides and alkaline earth metal hydroxides at the boiling temperature of the reaction mixture with concentration of said inorganic base in the aqueous phase being no greater than about 70% and with separation of said oxetane being by steam distillation.

References Cited in the file of this patent
FOREIGN PATENTS 850,752   Germany _____ Sept. 29, 1952

OTHER REFERENCES

Govaert et al.: Natuurwetensch. Tijdschr., 22:73–74 (1940).